United States Patent [19]

Mori

[11] Patent Number: 4,498,189
[45] Date of Patent: Feb. 5, 1985

[54] COMPARATOR SUITABLE FOR A CHARACTER RECOGNITION SYSTEM

[75] Inventor: Nobuhiko Mori, Tokyo, Japan

[73] Assignee: Nippon Electric Co., Ltd., Tokyo, Japan

[21] Appl. No.: 350,037

[22] Filed: Feb. 18, 1982

[30] Foreign Application Priority Data

Feb. 18, 1981 [JP] Japan .................................. 56-22563

[51] Int. Cl.³ .............................................. G06K 9/62
[52] U.S. Cl. ........................................ 382/30; 382/34
[58] Field of Search ..................... 340/146.2; 364/200 MS File, 900 MS File; 382/30, 33, 34

[56] References Cited

U.S. PATENT DOCUMENTS

| | | | |
|---|---|---|---|
| 2,984,824 | 5/1961 | Armstrong et al. | 364/900 |
| 3,273,127 | 9/1966 | Armstrong | 364/900 |
| 3,329,938 | 7/1967 | Armstrong | 364/900 |
| 3,428,946 | 2/1969 | Batcher | 364/900 |
| 3,636,519 | 1/1972 | Heath | 364/900 |
| 3,760,356 | 9/1973 | Srivastava | 382/30 |
| 4,288,782 | 9/1981 | Bader et al. | 382/34 |

Primary Examiner—Leo H. Boudreau
Attorney, Agent, or Firm—Laff, Whitesel, Conte & Saret

[57] ABSTRACT

In a pattern matching method, the input pattern of a character is compared with each of a plurality of standard patterns to detect similarities and differences by counting the number of pattern elements which are or are not matched with each other. To do this, a high-speed comparator stores a plurality of comparing data in a memory, which is driven by a clock pulse train. The memory produces a plurality of sequence signals during each time interval when the clock pulses of a number responding to a plurality of comparing data are applied thereto. The first or last produced sequence signal is detected from among the plurality of sequence signals and is used to extract the maximum or minimum data.

24 Claims, 3 Drawing Figures

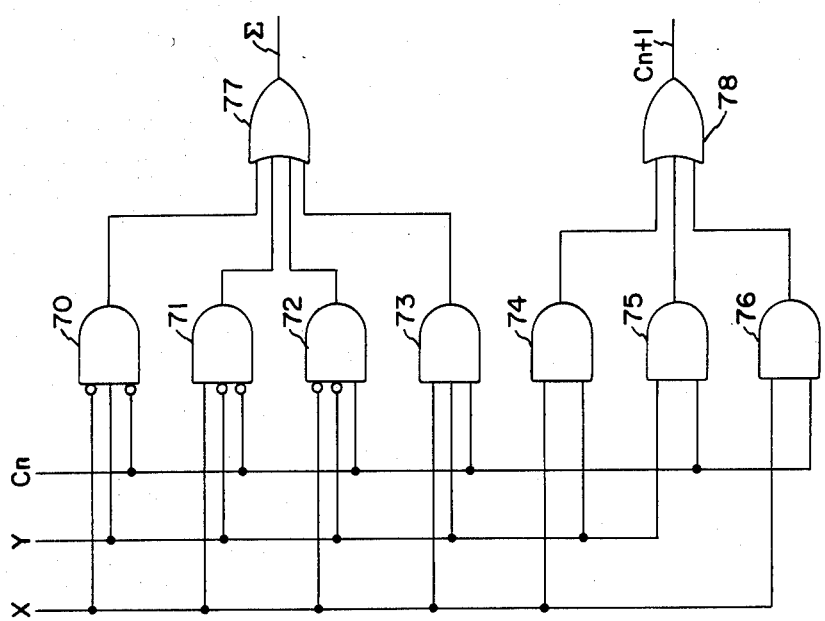
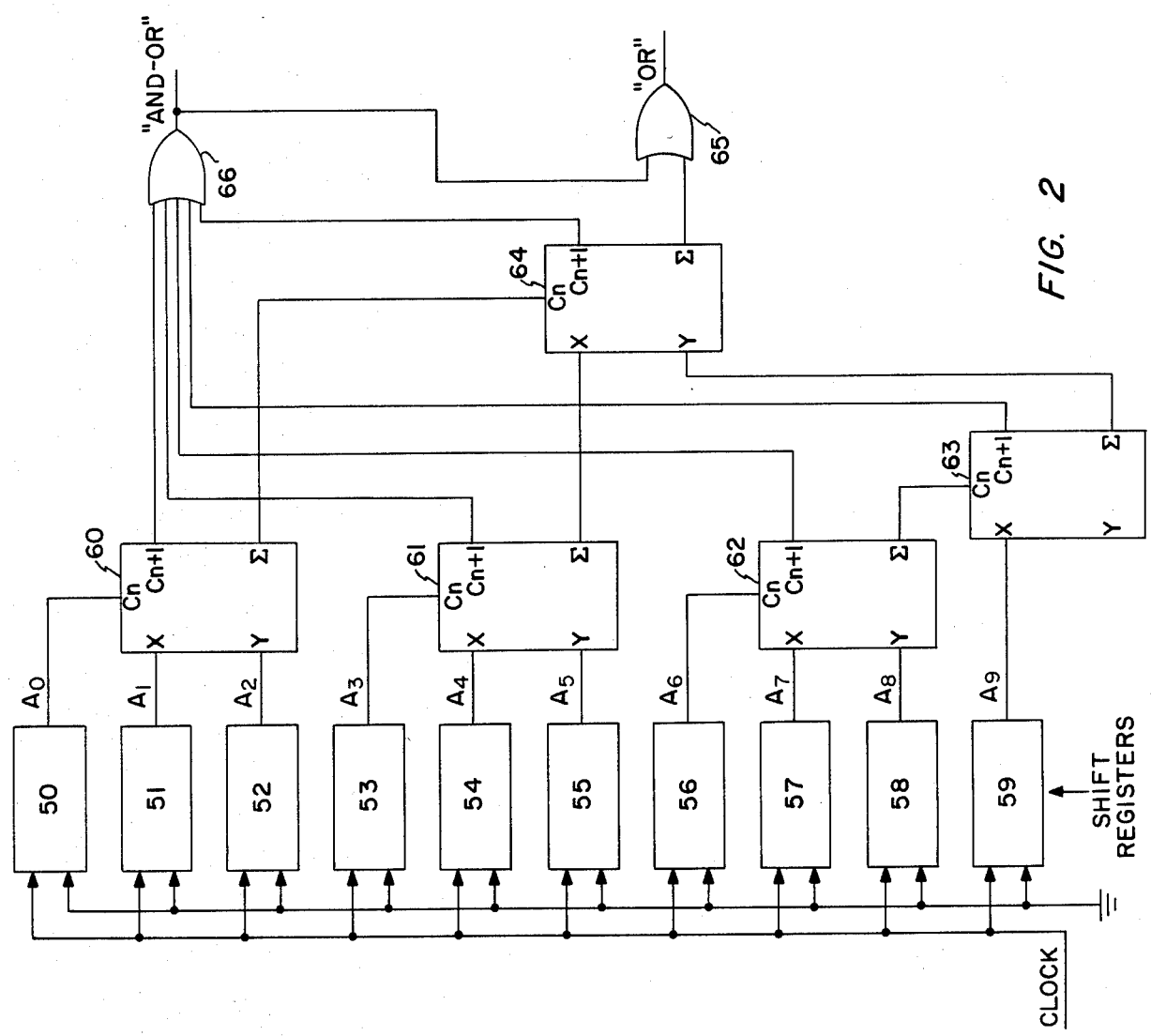
FIG. 3
FIG. 2

COMPARATOR SUITABLE FOR A CHARACTER RECOGNITION SYSTEM

This invention relates to a comparator for extracting the maximum or the minimum data from a plurality of comparing data.

Such comparator may be used as a similarity or a differentia comparator for comparing similarities or differentiae which are detected between an input pattern of an input letter and a plurality of standard patterns to recognize the input pattern in a character recognition system.

One of the many well-known methods for recognizing an input character by a character recognition system is pattern matching. A plurality of similarities or differentiae are detected by comparing an input pattern of an input character with the plurality of stored standard patterns. The maximum or minimum is extracted from these detected similarities or differentiae. The maximum similarity or the minimum differentia is examined to determine whether it is greater or less than a predetermined value and greater than the secondly maximum or a secondly minimum, by a preset value. When the comparison is affirmative, a standard pattern having the maximum similarity or minimum differentia is considered to match the input pattern. Thus, the input character is recognized as the character corresponding to the standard pattern having the maximum similarity or minimum differentia.

In a conventional similarity (or differentia) comparator for extracting the maximum similarity (or minimum differentia) by comparing a plurality of similarities, the plurality of similarities (or differentiae) are stored in turn in two registers. Two values stored in two registers are compared with each other, and the two-value-comparison is repeated to extract the maximum (or minimum) and secondly maximum (or minimum) from the plurality of similarities (or differentiae).

An operational period of time for the two-value-comparison is increased with a number of standard patterns. Therefore, this two-value-comparison is not suitable for a character recognition system having a great number of standard patterns for recognizing not only numerals but also alphabets, Japanese Katakama and Chinese characters.

It is, therefore, an object of this invention to provide a comparator in which the maximum or the minimum data can be extracted at high speed responsive to a comparison of a plurality of data.

It is another object of this invention to provide a similarity or differentia comparator suitable for a character recognition system, equipped to recognize a great number of standard patterns.

According to this invention, a high-speed comparator has a plurality of data for comparing stored in a memory means, which is driven by a clock pulse train. The memory means produces a plurality of sequence signals during each time interval when a number of clock pulses are applied thereto responsive to the plurality of compared data, respectively. The first- or last-produced sequence signal is detected from the plurality of sequence signals and is used to extract the maximum or minimum data.

The features and advantages of this invention will be understood from the detailed description of preferred embodiments of this invention taken in conjunction with the accompanying drawings, wherein:

FIG. 2 is a block diagram of a second embodiment of this invention; and

FIG. 3 is a block diagram of a full adder used in the second embodiment shown in FIG. 2.

Figure 1:
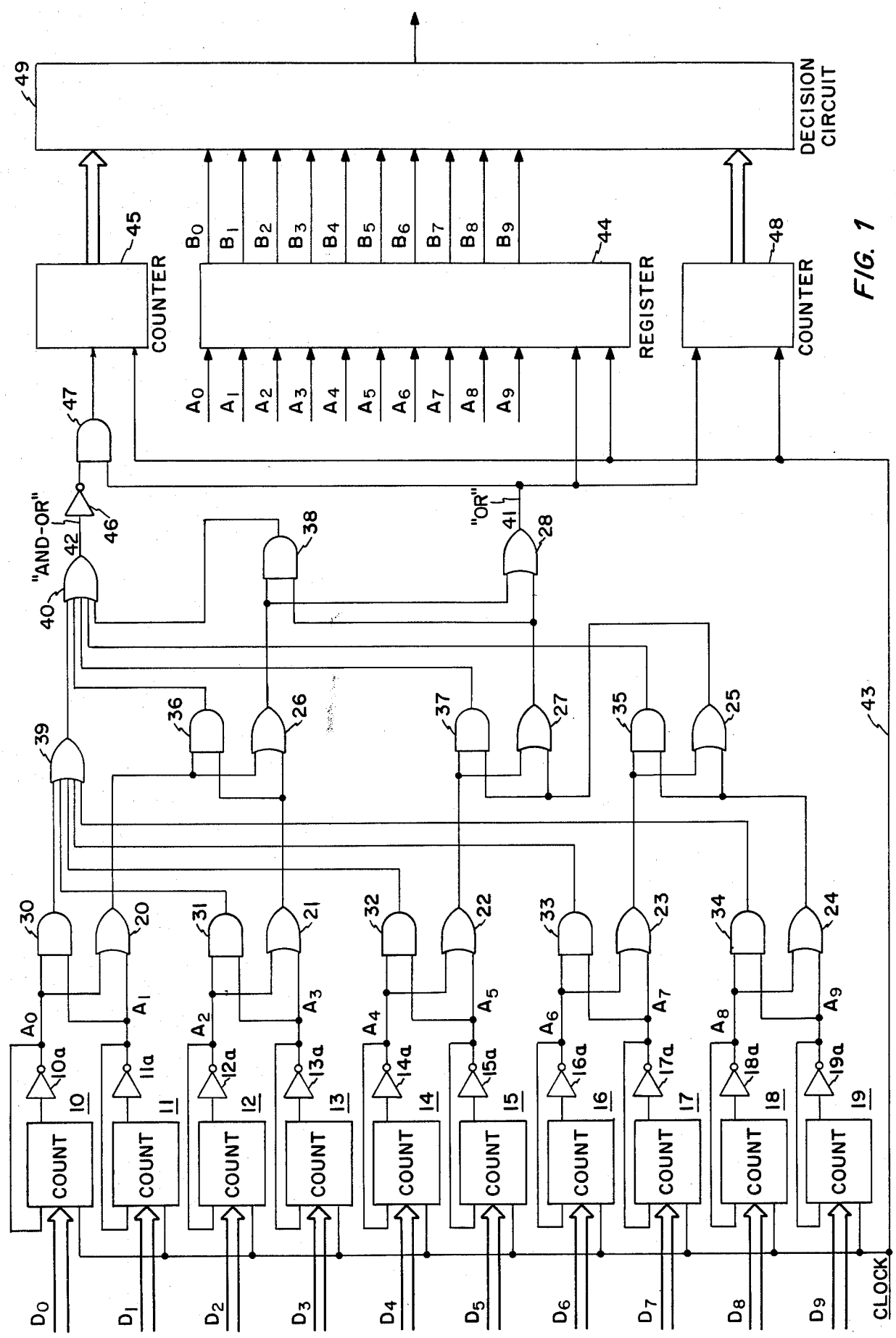
FIG. 1 is a block diagram of a first embodiment of this invention.

In pattern matching method, an input pattern of an input character is compared with each of a plurality of standard patterns to detect similarities and differentiae by counting a number of pattern elements which either are or are matched with each other, respectively. The Japanese Patent Disclosure No. 53-133335 discloses a method which simultaneously obtains a plurality of differentiae between an input pattern and a plurality of standard patterns.

Referring to FIG. 1, in a first embodiment of this invention, ten differentiae $D_0$ to $D_9$ are detected between an input pattern and ten standard patterns. These differentiae are stored, in response to an initiating signal (not shown), in ten counters 10 to 19, respectively. Each of these counters may be a 4-bit binary type of counter. The counters 10 to 19 count up clock pulses applied on a signal line 43, beginning the count with the differentiae stored as initial values therein. When the contents of the counters reach "15", i.e., binary "1111", the counters produce carry signals of logical "1". The carry signals of logical "1" from the counters 10 to 19, are inverted by inverters $10a$ to $19a$ to provide sequence signals $A_0$ to $A_9$ of logical "0", respectively. The sequence signals $A_0$ to $A_9$ are also applied to inhibit terminals of the counters 10 to 19, respectively, whereby the counting operations are inhibited in respective counters. In other words, when the content of a counter reaches "15", the sequence signal A changes from logical "1" to "0". An order of changing of the sequence signals $A_0$ to $A_9$ from "1" to "0" depends upon the values of the differentiae $D_0$ to $D_9$. That is, the counters in which the maximum differentia is stored firstly produces the sequence signal of logical "0", and the counter corresponding to the minimum differentia lastly produces the sequence signal of logical "0". After at least fifteen clock pulses have been applied, the contents of all counters 10 to 19 have reached "15" to provide the sequence signals $A_0$ to $A_9$ of logical "0".

The sequence signals $A_0$ to $A_9$ are OR-gated by OR gates 20 to 28 to provide, on a signal line 41, an OR-output signal "OR" represented by the following equation (1).

$$\text{"OR"} = A_0 + A_1 + A_3 + \ldots + A_9 \quad (1)$$

When at least one of the sequence signals $A_0$ to $A_9$ is a logical "1", the OR-output signal "OR" is also a logical "1". When all of the sequence signals $A_0$ a $A_9$ become to logical "0", the OR-output signal "OR" changes to a logical "0".

The sequence signals $A_0$ to $A_9$ are AND-OR operated by AND gates 30 to 38 and OR gates 39 and 40 to provide, on a signal line 42, an AND-OR output signal "AND-OR" represented by the following equation (2)

$$\text{"AND-OR"} = A_0 \cdot A_1 + A_0 \cdot A_2 + A_0 \cdot A_3 + \ldots + A_0 \cdot A_9 + \quad (2)$$
$$A_1 \cdot A_2 + A_1 \cdot A_3 + \ldots + A_1 \cdot A_9 +$$
$$A_2 \cdot A_3 + A_2 \cdot A_4 + \ldots + A_2 \cdot A_9 +$$
$$\vdots$$
$$A_7 \cdot A_8 + A_7 \cdot A_9 +$$
$$A_8 \cdot A_9$$

In other words, AND-gating operations are performed with respect to all combinations of two signals in the sequence signals $A_0$ to $A_9$, to provide AND-output signals. Then the AND-output signals are OR-gated to finally provide an AND-OR output signal "AND-OR". In the first embodiment, the AND-OR operation is performed by means of a minimum number of AND gates and OR gates.

When two or more signals in the sequence signals $A_0$ to $A_9$ are a logical "1", both the AND-OR output signal "AND-OR" and the OR output signal "OR" are a logical "1". When one signal is a logical "1", the AND-OR output signal "AND-OR" and the OR output signal "OR" are a logical "0" and "1", respectively. When all of the sequence signals $A_0$ a $A_9$ become to logical "0", both are logical "0".

The OR output signal "OR" is supplied to a register 44. The counters 10 to 19 also supply the sequence signals $A_0$ to $A_9$ to the register 44. Clock pulses are supplied over the signal line 43 to register 44. When the OR output signal "OR" is a logical "1", register 44 stores, in turn, the sequence signals $A_0$ to $A_9$, in synchronism with the clock pulse. Finally, register 44 stores the sequence signals $A_0$ to $A_9$ having a logical value at a time immediately before the OR output signal "OR" changes from a logical "1" to "0". Therefore, even when the OR output signal "OR" changes to "0", the only sequence signal which is not changed is the signal from the counter in which the minimum differentia had been stored, i.e. the signal which is a logical "1". Then, the stored sequence signal of a logical "1" is passed through register 44 to the corresponding output terminal B. Assuming that the differentia $D_5$ is the minimum in the differentiae $D_0$ a $D_9$, when the OR output signal "OR" becomes to logical "0", only the stored sequence signal $A_5$ is a logical "1" which is passed to the corresponding output terminals $B_5$.

The first embodiment comprises a counter 45 which receives through an AND gates 47, the OR output signal "OR" and the AND-OR which is output signal "AND-OR" inverted by an inverter 46. The counter 45 is initially reset to "0" by the initiating signal (not shown). Then, it counts up the clock pulses when the AND-OR output signal "AND-OR" is a logical "0" and the OR output signal "OR" is a logical and "1". Therefore, the counter 45 finally stores the difference between the minimum differentia and the second from minimum differentia. If the differentia $D_8$ is the second from the minimum, the final content of the counter 45 is $D_8-D_5$. The final content of value "0" means that at least two differentiae have the minimum value. In this case, the register 44 produces two output signals of a logical "1" on the corresponding output terminals B (e.g., $B_5$ and $B_8$, when $D_5=D_8$).

The OR output signal "OR" is also applied to a counter 48, which is initially preset to "15" by the initiating signal. The counter 48 counts down, one by one, in synchronism with the clock pulses when the OR output signal "OR" is a logical "1". Finally, counter 48 stores a value equal to the minimum differentia, e.g., $D_5$.

The output data from the register 44 and the counter 45 and 48 are supplied to a character decision circuit 49 in which a final recognition is performed by using such output data, in the following manner. First, the minimum differentia is examined to determine whether it is less than a predetermined value $V_1$, by comparing the output data from the counter 48 with the predetermined value $V_1$. If the difference between the minimum differentia and the second from minimum differentia is greater than a preset value $V_2$, it is found by comparing the data from the counter 45 with the preset value $V_2$. When the above two conditions are satisfied, the decision circuit 49 produces a recognition result corresponding to the output signal of a logical "1" from the register 44. When the comparison is not satisfied, the decision circuit produces a recognition result indicating that the recognizing is impossible.

As will be understood from the above description, in the first embodiment, when the differentiae are stored in the counters 10 to 19 in response to the initiating signal and then fifteen clock pulses have been applied, all the data necessary for the character recognition can be obtained. This means that an operational period of time for extracting the minimum differentia is extremely short and is not affected by a number of the standard patterns, i.e., a number of the counters in which the differentia are stored.

In the case where the differentiae D, to be stored in the counters 10 to 19, are limitted to an upper limit value, which is less than the predetermined value $V_1$, the counter 48 may be omitted.

In the first embodiment, the differentiae are stored in the counters 10 to 19. In case where the similarities are stored in the counters 10 to 19, the counters count down one by one. The borrow signals are produced when the contents of counters 10–19 become a logical "0" and are used without inverting, as the sequence signals $A_0$ to $A_9$. The counter 48 is first reset to "0" by the initiating signal and then it counts up, one by one, during the OR output signal of logical "1". After fifteen clock pulses have been applied, the register 44 stores the position information of the counter in which the maximum similarity is stored. The counter 45 produces the output data representative of the difference between the maximum similarity and the second from the maximum similarity. The counter 48 generates the output data equal to the maximum similarity.

When the above output data are produced with respect to the similarities and are to the decision circuit 49 applied, it performs the final recognition in the following manner. The output data (maximum similarity) from the counter 48 is compared with the predetermined value, and the output data (difference between the maximum and second from maximum similarities) is compared with the preset value. When both output data are greater than the predetermined and preset values, respectively, the decision circuit 49 generates the recognition result corresponding to the output signal of logical 1, from the register 44, i.e., the position information of the counter in which the maximum similarity is stored.

Referring to FIG. 2, in a second embodiment of this invention, ten 15-stage shift registers 50 to 59 are provided, as means for producing the sequence signals $A_0$ to $A_9$, respectively. These shift registers are used instead of the counters 10 to 19 which are used in the first embodiment. The differentiae $D_0$ to $D_9$ are stored in the shift registers 50 to 59 in response to the initiating signal in the following manner. The bits of a logical "0" have a bit number equal to the differentia to be stored in each shift register and are stored in turn in the left stages. The bits of a logical "1" are stored in the remaining right stages. If the differentia to be stored is "8", the storing in the shift register is as follows:

000000001111111

The shifting in the shift register is carried, by the clock pulse, to the right. Thus, the sequence signals $A_0$ to $A_9$ can be obtained at the output terminals of the shift registers 50 to 59, respectively. The sequence signals $A_0$ to $A_9$ from the shift registers 50 to 59 may be supplied to the circuit comprised of the OR gates 20 to 28, AND gates 30 to 38, and OR gates 39 and 40, all of which are shown in the first embodiment of FIG. 1.

The use of the shift registers 50 to 59 is advantageous in the case where there is a relatively low upper limit to the value of the differentiae to be stored. The counters 10 to 19 are suitable in a circuit configuration when the upper limit value is relatively high.

The second embodiment comprises five full adders 60 to 64 and OR gates 65 and 66 which are provided for producing the OR output signal "OR" and the AND-OR output signal "AND-OR", instead of the OR gates 20 to 28, AND gates 30 to 38 and OR gates 39 and 40 which are shown in the first embodiment.

Each of the full adders 60 to 64 has input terminals X, Y and Cn: a carry output terminal $C_{n+1}$ and an adder output terminal $\Sigma$, each adder performs the following logical equations (in which input and output signals are represented by the same symbols of the input and output terminals):

$$\Sigma = X \oplus Y \oplus Cn$$
$$= \overline{X} \cdot Y \cdot \overline{Cn} + X \cdot \overline{Y} \cdot \overline{Cn} + \overline{X} \cdot \overline{Y} \cdot Cn + X \cdot Y \cdot Cn$$

$$C_{n+1} = X \cdot Y + X \cdot Cn + Y \cdot Cn$$

As shown in FIG. 3, each such full adder may be composed of inhibit gates 70 to 72, AND gates 73 to 76, and OR gates 77 and 78.

The circuit which is composed of the full adders 60 to 64 and OR gates 65 and 66 performs the above-mentioned equations (1) and (2) to provide the OR output signal "OR" and the AND-OR output signal "AND-OR" on the output terminals of the OR gates 65 and 66, respectively.

The OR output signal "OR" and the AND-OR output signal "AND-OR" may be supplied to the register 44 (FIG. 1) and the counters 45 and 48 in the first embodiment.

As clearly understood from the above description, the sequence signals $A_0$ to $A_9$ from the counters 10 to 19 (FIG. 1) may be supplied to the circuit composed of the full adders 60 to 64 and OR gates 65 and 66 (FIG. 2) in order to provide the OR output signal "OR" and the AND-OR output signal "AND-OR".

In case where the similarities are to be stored in the shift registers 50 to 59, the bits of logical "1" having a bit number equal to the similarity are stored in the right stages, and the bits of logical "0" are stored in the remaining left stages.

In the above-mention embodiments, the last-produced sequence signal and the second from the last-produced sequence signal are used for extracting the maximum similarity or the minimum differentia and the secondly maximum similarity or the second from minimum differentia, respectively. Instead of the last-produced sequence signal and the second from-last-produced signal, the first-produced sequence signal and the second-produced sequence signal may be used for the maximum or minimum data and secondly maximum or secondly minimum data.

What is claimed is:

1. A method of comparing pattern signals to determine whether they are the same as or different from any of a great plurality of predetermined pattern signals, said comparison method comprising the steps of:
   (a) storing incoming signals representing differences between the compared signals;
   (b) clocking the stored signals to find maximum and minimum differences;
   (c) detecting first and last signals to identify said maximum and minimum differences;
   (d) finding and comparing the minimum with the next to minimum and the maximum with the next to the maximum; and
   (e) extracting the maximums and minimums responsive to said first and last signals.

2. The method of claim 1 and the added step of comparing the various maximum signals with threshold values in order to decide whether the signals are the same or different.

3. A comparator for extracting maximum data from a plurality of compared data, said comparator comprising:
   means for storing said plurality of data for comparing;
   means for applying clock pulses to said storing means, said storing means producing a plurality of sequence signals at each time period when the number of said clock pulses which are applied to said storing means corresponds to said compared data;
   first detecting means for detecting a first-produced sequence signal from said plurality of sequence signals, said first-produced sequence signal being produced from said storing means in response to at least one of said plurality of compared data having the maximum data;
   first extracting means responsive to said first-produced sequence signal for extracting said maximum data;
   second detecting means for detecting a second-produced sequence signal from said plurality of sequence signals;
   second extracting means responsive to said second-produced sequence signal for extracting the second from the maximum data;
   means responsive to said first-produced and second-produced sequence signals and to said clock pulses for producing a difference signal which is representative of a difference between said maximum data and said second from maximum data; and
   means resonsive to said maximum data and to said difference signal for finally judging whether said maximum data is to be sent out as an output data of said comparator.

4. A comparator as claimed in claim 3, wherein said storing means comprises a plurality of counters, said data for comparing are stored in said counters as initiating values, respectively, and a counting operation is performed in said counter in response to said clock pulses.

5. A comparator as claimed in claim 3, wherein said storing means comprises a plurality of shift registers, said data for comparing are stored in said shift registers as bit signals having a bit number corresponding to said compared data, and a shifting operation is performed in said shift register in response to said clock pulses.

6. The comparator as claimed in claim 3, wherein said first detecting means comprises a plurality or OR gates.

7. A comparator as claimed in claim 3, wherein said first and second detecting means comprises a plurality of AND gates and OR gates.

8. The comparator as claimed in claim 3, wherein said first and second detecting means comprises a plurality of full adders and OR gates.

9. The comparator as claimed in claim 8, wherein said full adder comprises a plurality of inhibit gates, AND gates and OR gates.

10. A comparator as claimed in claim 3, wherein each of said sequence signals is a logical "0", and said sequence signals are OR-gated to provide a first signal.

11. A comparator as claimed in claim 10, wherein AND-gating operations are performed with respect to all combinations of two signals in said sequence signals to provide AND-output signals, and said AND-output signals are OR-gated to provide a second signal.

12. The comparator as claimed in claim 11, further comprising counting means for counting said clock pulses in response to said first and second signals to provide data representative of a difference between said maximum data and a second-from-the maximum-from-the data.

13. A comparator as claimed in claim 10, further comprising register means for storing said sequence signals in response to said first signal.

14. A comparator as claimed in claim 10, further comprising counting means for counting said clock pulses in response to said first signal to provide data representative of said maximum data.

15. The comparator as claimed in claim 3, wherein said comparing data are similarities detected by comparing an input pattern to be recognized and a plurality of standard patterns, and the maximum similarity is extracted.

16. A comparator for extracting minimum data from a plurality of compared data, said comparator comprising:
   means for storing said plurality of data for comparing;
   means for applying clock pulses to said storing means, said storing means producing a plurality of sequence signals at each time period when the number of said clock pulses which are applied to said storing means corresponds to said compared data;
   first detecting means for detecting a last-produced sequence signal from said plurality of sequence signals, said last-produced sequence signal being produced from said storing means in response to at least one of said plurality of compared data having the minimum data;
   first extracting means responsive to said last-produced sequence signal for extracting said minimum data;
   second detecting means for detecting a second-from-the-last produced sequence signal from said plurality of sequence signals;
   second extracting means responsive to said second-from-the-last-produced sequence signal for extracting the second from the minimum data;
   means responsive to said last-produced and said second-from-the-last produced sequence signals and to said clock pulses for producing a difference signal which is representative of a difference between said minimum data and said second from minimum data; and
   means responsive to said minimum data and to said difference signal for finally judging whether said minimum data is to be sent out as an output data of said comparator.

17. The comparator as claimed in claim 16, wherein said comparing data are differentiae detected by comparing an input pattern to be recognized and a plurality of standard patterns, and the minimum differentia is extracted.

18. A comparator as claimed in claim 16, wherein said storing means comprises a plurality of counters, said data for comparing are stored in said counters as initiating values, respectively, and a counting operation is performed in said counter in response to said clock pulses.

19. The comparator as claimed in claim 16, wherein said first and second detecting means comprises a plurality of full adders and OR gates.

20. The comparator as claimed in claim 16, wherein each of said sequence signals is a logical "0", and said sequence signals are OR-gated to provide a first signal, and register means for storing said sequence signals in response to said first signal.

21. The comparator as claimed in claim 16, wherein each of said sequence signals is a logical "0", and said sequence signals are OR-gated to provide a first signal, and counting means for counting said clock pulses in response to said first signal to provide data representative of said minimum data.

22. The comparator as claimed in claim 16, wherein each of said sequence signals is a logical "0", and said sequence signals are OR-gated to provide a first signal, means for performing AND-gating operations with respect to all combinations of two signals in said sequence signals to provide AND-output signals, means for OR-gating said AND-output signals to provide a second signal, and counting means for counting said clock pulses in response to said first and second signals to provide data representative of a difference between minimum data and a second-from the minimum data.

23. A comparator having a plurality of input terminals, a plurality of clock driven counter means, each of said terminals being coupled to an individually associated one of said counter means, means responsive to signals received at said input terminals for storing maximum and minimum differentia in first of said counter means corresponding to the input terminals receiving the stored signals, means responsive to said sequence of signals for detecting and extracting the data which is next to said maximum and minimum data, respectively, said extracted data being stored in a second of said counter means, means responsive to said clock drive of said counter means for transferring signals from said counter means into a register means in synchronization with a sequence of signals, and means responsive to the first and the last of said sequence of signals for extracting said differentia from among the signals received at said input terminals.

24. The comparator of claim 23 and means for indicating both the difference between the minimum and the next to minimum and the difference between the maximum and the next to maximum data, respectively.

* * * * *